US008811967B2

(12) United States Patent
Abramson et al.

(10) Patent No.: US 8,811,967 B2
(45) Date of Patent: Aug. 19, 2014

(54) CHANGING THE USER INTERFACE AT A TELECOMMUNICATIONS TERMINAL

(75) Inventors: Sandra R. Abramson, Freehold, NJ (US); Stephen M. Milton, Freehold, NJ (US); Richard Reid Hovey, Branchburg, NJ (US); Richard Matthews, West Sussex (GB)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/621,050

(22) Filed: Sep. 15, 2012

(65) Prior Publication Data

US 2013/0017813 A1    Jan. 17, 2013

Related U.S. Application Data

(63) Continuation of application No. 11/122,866, filed on May 5, 2005.

(51) Int. Cl.
*H04M 3/00* (2006.01)
*H04W 4/00* (2009.01)
*H04M 3/42* (2006.01)

(52) U.S. Cl.
USPC ............... 455/418; 455/415; 455/461

(58) Field of Classification Search
CPC ............ H04M 1/72563; H04M 1/72597; H04M 3/54; H04M 1/575; H04M 2203/2005; H04M 3/42051; H04M 3/42314; H04M 3/42323; H04M 3/543; H04M 2203/2027; H04W 4/16; H04W 4/14
USPC .............. 455/415, 417–419, 459, 461; 379/142.01–142, 18, 245–249, 379/211.01–213.01, 142.01–142.18; 715/740, 746
See application file for complete search history.

(56) References Cited

U.S. PATENT DOCUMENTS 5,265,157 A   11/1993   Jolissaint et al.
5,351,289 A   9/1994    Logsdon et al.
(Continued)

FOREIGN PATENT DOCUMENTS

EP    330856     9/1989
EP    1052836    11/2000
(Continued)

OTHER PUBLICATIONS

Handley, Dr. Michael, "GB Application No. GB0710523.2 Office Action Dec. 17, 2009", ,Publisher: UK IPO, Published in: UK.

(Continued)

*Primary Examiner* — Daniel Lai
(74) *Attorney, Agent, or Firm* — Maldjian Law Group LLC; John Maldjian; Alexander D. Walter (57) ABSTRACT

A technique is disclosed that changes one or more properties of a user interface at a telecommunications terminal based on an incoming call. When a first caller calls the telephone number of the terminal directly and the terminal answers the call, the terminal presents the direct call to the user through a first user interface. When a second caller calls a telephone number that is associated with a data-processing system and the call is then redirected to the terminal, the terminal presents the redirected call to the user through a second user interface. The telecommunications terminal can be a cell phone that belongs to a user, and the data-processing system can be a private branch exchange that serves an office enterprise network that the user belongs to, wherein the private branch exchange extends the call to the user's cell phone when the user is out of the office.

5 Claims, 10 Drawing Sheets

(56) References Cited

U.S. PATENT DOCUMENTS

| | | | |
|---|---|---|---|
| 5,452,347 | A | 9/1995 | Iglehart et al. |
| 5,544,235 | A | 8/1996 | Ardon |
| 5,559,868 | A | 9/1996 | Blonder |
| 5,561,705 | A | 10/1996 | Allard et al. |
| 5,724,411 | A | 3/1998 | Eisdorfer et al. |
| 5,815,562 | A | 9/1998 | Iglehart et al. |
| 5,946,386 | A | 8/1999 | Rogers et al. |
| 5,960,200 | A | 9/1999 | Eager et al. |
| 5,978,674 | A | 11/1999 | Jackson et al. |
| 6,044,148 | A | 3/2000 | Bleile |
| 6,160,876 | A | 12/2000 | Moss et al. |
| 6,366,772 | B1* | 4/2002 | Arnson ............... 455/415 |
| 6,405,032 | B1 | 6/2002 | Buhrmann |
| 6,516,061 | B2 | 2/2003 | Horowitz et al. |
| 6,542,475 | B1* | 4/2003 | Bala et al. ............ 370/271 |
| 6,622,017 | B1 | 9/2003 | Hoffman |
| 6,721,412 | B1 | 4/2004 | Youngs |
| 6,738,466 | B1* | 5/2004 | LaPierre et al. ...... 379/211.02 |
| 6,757,372 | B1 | 6/2004 | Dunlap et al. |
| 6,850,604 | B2 | 2/2005 | Cannell et al. |
| 6,993,360 | B2 | 1/2006 | Plahte et al. |
| 7,174,189 | B1 | 2/2007 | Chen et al. |
| 2001/0043691 | A1* | 11/2001 | Bull et al. ............ 379/142.08 |
| 2002/0015484 | A1 | 2/2002 | Maeng |
| 2002/0044642 | A1 | 4/2002 | Danner et al. |
| 2002/0132638 | A1* | 9/2002 | Plahte et al. ............ 455/555 |
| 2003/0095644 | A1 | 5/2003 | St-Onge et al. |
| 2003/0139175 | A1 | 7/2003 | Kim |
| 2004/0042603 | A1 | 3/2004 | Edge et al. |
| 2004/0067751 | A1 | 4/2004 | Vandermeijden et al. |
| 2004/0207508 | A1 | 10/2004 | Lin et al. |
| 2004/0218733 | A1 | 11/2004 | Chin et al. |
| 2005/0048967 | A1* | 3/2005 | Hoglander et al. ...... 455/426.1 |
| 2005/0080880 | A1 | 4/2005 | von Tetzchner et al. |
| 2005/0096030 | A1 | 5/2005 | Boyd et al. |
| 2005/0157859 | A1* | 7/2005 | Rodriguez et al. ....... 379/142.01 |
| 2005/0243991 | A1 | 11/2005 | Fijolek et al. |
| 2005/0265237 | A1 | 12/2005 | Suan |
| 2006/0062371 | A1 | 3/2006 | Vanderheiden et al. |

FOREIGN PATENT DOCUMENTS

| | | |
|---|---|---|
| EP | 1069750 | 1/2001 |
| GB | 2305817 | 4/1997 |
| GB | 2314484 | 12/1997 |
| JP | 5048744 | 2/1993 |
| JP | 8242301 | 9/1996 |
| JP | 2000125016 | 4/2000 |
| JP | 2003092613 | 3/2003 |
| WO | 02/96067 | 1/2002 |
| WO | 03/063455 | 7/2003 |

OTHER PUBLICATIONS

Steckert, "DE Application No. 10 2007 025161.2 Office Action Jun. 24, 2010" Publisher: DPMA, Published in: DE.

German Patent Application No. 1 02007025161.2, Communication dated Dec. 28, 2011, Avaya Technology LLC, 7 Pages.

Chinese Patent Application No. 200610110894.5, Decision of Rejection dated Nov. 24, 2011, Avaya Technology LLC., 16 pages.

Chinese Patent Application No. 200610110894.5, Second Office Action dated Aug. 5, 2010, Avaya Technology LLC., 14 pages.

Japanese Patent Application No. 2008-32255, Appeal Examiner's Office Letter dated Aug. 23, 2010, Avaya Technology LLC., 4 pages.

Ishii, K., "JP Application No. 2008-32255 Office Action Aug. 25, 2010", , Publisher: JPO, Published in: JP.

U.S. Appl. No. 11/122,866, Examiner's Answer to Appeal Brief dated Sep. 3, 2009, 10 pages.

Chinese Patent Application No. 200610110894.5, First Office Action dated Apr. 3, 2009, Avaya Technology LLC., 25 pages.

European Patent Application No. 06252315.4, Communication dated Jan. 16, 2007, Avaya Technology LLC., 4 pages.

European Patent Application No. 06252315.4, Extended Search Report dated Aug. 21, 2006, Avaya Technology LLC., 6 pages.

Japanese Patent Application No. 2006-128235, Examiner's Office Letter dated May 16, 2007, Avaya Technology LLC., 6 pages.

Japanese Patent Application No. 2006-128235, Examiner's Refusal Decision dated Sep. 22, 2008, Avaya Technology LLC., 2 pages.

Japanese Patent Application No. 2006-128235, Examiner's Office Letter dated Apr. 18, 2008, Avaya Technology LLC., 4 pages.

U.S. Appl. No. 11/122,866, Advisory Action dated Jun. 12, 2007, 3 pages.

U.S. Appl. No. 11/122,866, Non-Final Office Action dated Oct. 27, 2006, 11 pages.

U.S. Appl. No. 11/122,866, Final Office Action dated Mar. 21, 2007, 8 pages.

U.S. Appl. No. 11/122,866, Non-Final Office Action dated Sep. 17, 2007, 6 pages.

Ascendent Systems, "Blackberry Mobile Voice System," Ascendent Systems http://www.ascendentsystems.com/products/technical/index.aspx, 2008, Publisher: Research in Motion, Published in: US, 1 page.

U.S. Appl. No. 11/122,866, Non-Final Office Action dated Mar. 14, 2008, 7 pages.

European Patent Application No. 06252315.2, Communication dated Apr. 5, 2011, Avaya Inc., 5 pages.

U.S. Appl. No. 11/962,092, Final Office Action dated Aug. 9, 2010, 14 pages.

U.S. Appl. No. 11/962,092, Final Office Action dated Dec. 14, 2009, 10 pages.

U.S. Appl. No. 11/962,092, Non-Final Office Action Mar. 31, 2010, 12 pages.

U.S. Appl. No. 11/962,092, Non-Final Office Action Jun. 11, 2009, 9 pages.

U.S. Appl. No. 11/962,092, Non-Final Office Action Jul. 11, 2008, 7 pages.

U.S. Appl. No. 11/962,092, Final Office Action Jan. 5, 2009, 9 pages.

http://web.archive.org/web/2001 0420100837/http://www.access-board.gov/telecom m/marketrep/featu res/auto_answer. htm.

* cited by examiner

CHANGING THE USER INTERFACE AT A TELECOMMUNICATIONS TERMINAL

FIELD OF THE INVENTION

The present invention relates to telecommunications in general, and, more particularly, to changing the user interface at a telecommunications terminal.

BACKGROUND OF THE INVENTION

Figure 1:
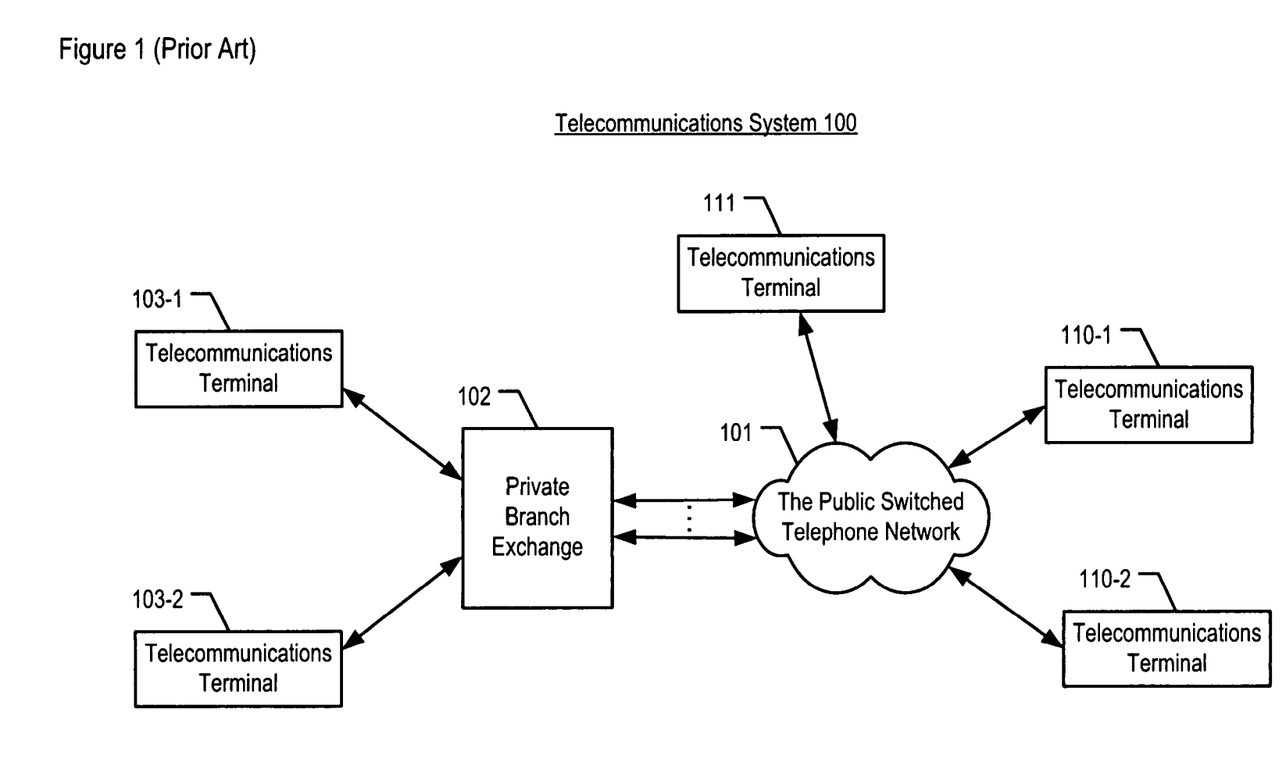
FIG. 1 depicts a schematic diagram of a telecommunications system in the prior art.

FIG. 1 depicts a schematic diagram of a telecommunications system in the prior art. Telecommunications system 100 comprises:

i. the Public Switched Telephone Network, ii. private branch exchange 102, iii. telecommunications terminals 103-1 and 103-2, iv. telecommunications terminals 110-1 and 110-2, and v.; telecommunications terminal 111; all of which are interconnected as shown.

The Public Switched Telephone Network (i.e., element 101) is a complex of telecommunications equipment that is owned and operated by different entities throughout the World. In the United States of America, for example, the Public Switched Telephone Network (or "PSTN") comprises an address space that is defined by ten digits, and, therefore, comprises 10 billion unique addresses or "telephone numbers." The Public Switched Telephone Networks in other countries are similar.

The Public Switched Telephone Network provides telecommunications service to telecommunications terminals 110-1, 110-2, and 111. Telecommunications terminals 110-1, 110-2, and 111 can be either wireline terminals or wireless terminals, or a combination of both.

Private branch exchange 102 is capable of switching incoming calls (e.g., from terminal 111, etc.) from the Public Switched Telephone Network via one or more transmission lines to terminals 103-1 and 103-2. Private branch exchange 102 is also capable of handling outgoing calls from terminals 103-1 and 103-2 to the Public Switched Telephone Network via one or more transmission lines.

Private branch exchange 102 is capable of also extending an incoming call (e.g., from terminal 111, etc.) to a telephone number of an "off-premises" terminal in the Public Switched Telephone Network, in addition to switching the same incoming call to an "on-premises terminal" within the enterprise area (e.g., an office building, etc.) that is served by exchange 102. Terminals 103-1 and 103-2 are considered to be on-premises terminals with respect to private branch exchange 102, while terminals 110-1 and 110-2 are considered to be off-premises terminals.

To accomplish the switching of an incoming, enterprise-related call to one of on-premises terminals 103-1 and 103-2, and the extending of the call to one of off-premises terminals 110-1 and 110-2, private branch exchange 102 maintains a table that correlates the off-premises telephone number to the on-premises, private branch exchange (PBX) extension. Table 1 depicts a table that illustrates the correlation.

TABLE 1

PBX Extension-to-PSTN Number Database

| On-Premises Telecommunications Terminal | Private Branch Exchange Extension | Telecommunications Network Number |
|---|---|---|
| 103-1 | 732-555-0102, x11 | 201-555-1236 |
| 103-2 | 732-555-0102, x12 | 908-555-3381 |
| ... | ... | ... |

As an example, a caller at terminal 111 who wishes to reach the PBX user of terminal 103-1 dials the PBX number (i.e., 732-555-0102). Private branch exchange 102 receives the incoming call, including the extension number (i.e., x11). Using information stored in memory and similar to what is shown in Table 1, private branch exchange 102 determines that the call is also to be extended to off-premises telephone number 201-555-1236, associated with terminal 110-1. The off-premises number corresponds to the off-premises terminal (e.g., a cellular phone, a home phone, etc.) that belongs to the PBX user of terminal 103-1. The idea behind transmitting the call to both terminal 103-1 and 110-1 is that if the PBX user is not reachable at his office phone (i.e., terminal 103-1), then maybe he is reachable at a phone that is outside of the office (i.e., terminal 110-1). The caller's experience is enhanced by the caller only having to use a single telephone number to reach the PBX user, even if the user is not in the office.

In contrast, the called PBX user's experience in the prior art can be very different than that of the caller. Even with a call that has been extended to the user from the private branch exchange, the caller has an expectation that the user will respond to the call—and moreover to the caller—as if the user is at the office. The caller, after all, has called a business number. The user, however, answers the call at an outside phone that has a different user interface than that of the office phone. Furthermore, the user might receive only minimal information for establishing the context of the call, which presents additional challenges to the user because the redirected calls that arrive from the private branch exchange are mainly from people (e.g., customers calling tech support, etc.) who are strangers to the user. In using the outside phone, the user's ability to respond to the caller is potentially diminished, compared to using the office phone.

What is needed is a technique to enhance how a telecommunications terminal and its user interact, without some of the disadvantages in the prior art.

SUMMARY OF THE INVENTION

The present invention changes one or more properties of a user interface at a telecommunications terminal based on an incoming call. When a first caller calls the telephone number of the terminal directly and the terminal answers the call, the terminal presents the direct call to the user through a first user interface. When a second caller calls a telephone number that is associated with a data-processing system and the call is then redirected to the terminal, the terminal presents the redirected call to the user through a second user interface. For example, the telecommunications terminal can be a cell phone that belongs to a user, and the data-processing system can be a private branch exchange that serves an office enterprise network that the user belongs to, wherein the private branch exchange extends the call to the user's cell phone when the user is out of the office.

The user interface of the terminal is characterized by one or more properties that govern how a user interacts with: (i) the terminal, (ii) a call or calls handled by the terminal, and (ii) one or more data-processing systems accessible by the terminal. The user interface properties include, but are not limited to, one or more of the following:

i. how calls are presented to the user;
    ii. the treatment that a user can apply to calls;
    iii. the call-dependent features available to the user;
    iv. the call-independent features available to the user;
    v. how a user invokes the features;
    vi. the number of accessible call appearances;
    vii. the functions that are assigned to the terminal's soft keys;
    viii. the menus available to the user;
    ix. how the user accesses the menus; and
    x. the speed dialing list that is in effect.

In accordance with the illustrative embodiment of the present invention, the telecommunications terminal is capable of handling M different user interface properties, wherein M is a positive integer. The telecommunications terminal of the illustrative embodiment is also capable of handling N different operating modes, wherein N is a positive integer. The term "operating mode" refers to the telecommunications terminal operating as an off-premises terminal to an enterprise network, as its user's personal cell phone, or in yet another operating mode.

The data-processing system and telecommunications terminal of the illustrative embodiment are a private branch exchange and a cell phone, respectively. In accordance with the illustrative embodiment of the present invention, the off-premises, telecommunications terminal receives a call from the private branch exchange that was originated to the enterprise network, along with an indication that the call has been extended to the terminal. The terminal changes one or more properties of its user interface because the call has been extended to the terminal.

By changing the user interface based on the incoming call, the illustrative embodiment of the present invention enhances the user's call-handling experience, in that the user is provided with the proper context in which to handle the call. For calls that have been redirected from the private branch exchange, the terminal might change its user interface, for example, to resemble that of the user's office phone, with respect to features, menus, functions, and so forth. The same terminal might change its user interface back to that of an ordinary cell phone for a call that is directly incoming to the terminal (i.e., not through the private branch exchange).

The illustrative embodiment of the present invention comprises: (a) transmitting a call to a telecommunications terminal; and (b) transmitting a first indication to the telecommunications terminal that the call was not originally directed to the telecommunications terminal.

DETAILED DESCRIPTION

Figure 2:
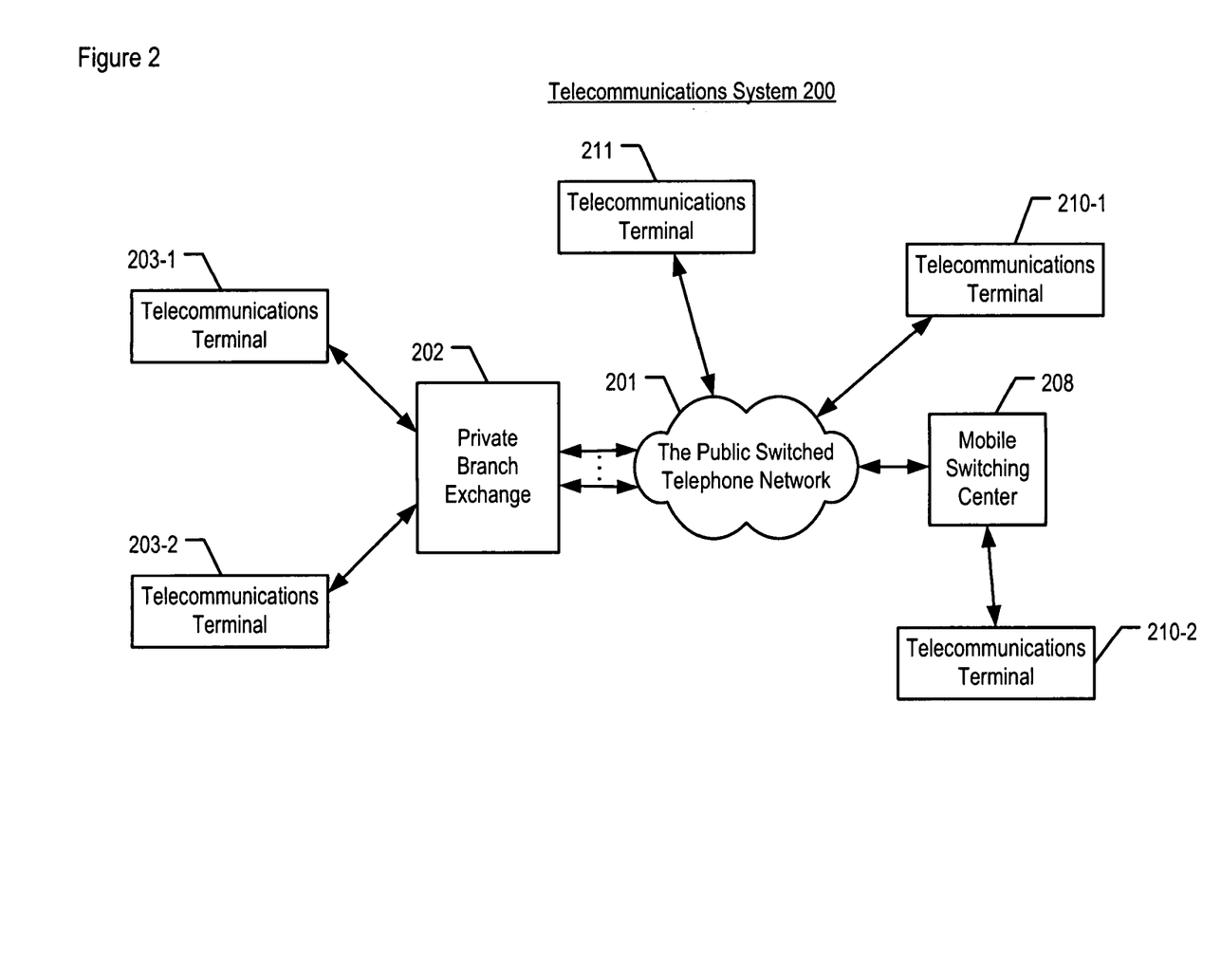
FIG. 2 depicts a schematic diagram of a telecommunications system, in accordance with the illustrative embodiment of the present invention.

FIG. 2 depicts a schematic diagram of a telecommunications system, in accordance with the illustrative embodiment of the present invention. Telecommunications system 200 comprises:

i. the Public Switched Telephone Network,
    ii. private branch exchange 202,
    iii. telecommunications terminals 203-1 and 203-2,
    iv. mobile switching center 208,
    v. telecommunications terminals 210-1 and 210-2, and
    vi. telecommunications terminal 211; all of which are interconnected as shown.

The Public Switched Telephone Network (i.e., element 201) provides telecommunications service to wireline telecommunications terminals 210-1 and 211, and interconnects multiple telecommunications networks, such as the enterprise network served by private branch exchange 202 and the wireless cellular network served by mobile switching center 208. The enterprise network served by private branch exchange 202 provides telecommunications service to associated telecommunications terminals, including wireline terminals 203-1 and 203-2. The cellular network served by mobile switching center 208 provides telecommunications service to wireless telecommunications terminals, including terminal 210-2.

It will be clear to those skilled in the art, after reading this disclosure, how to make and use alternative embodiments of the present invention in which some or all of the telecommunications terminals are wireline or some or all are wireless.

Private branch exchange 202 is a data-processing system, the salient components of which are described below and with respect to FIG. 3. Private branch exchange 202 is capable of switching incoming calls (e.g., from terminal 211, etc.) from the Public Switched Telephone Network via one or more transmission lines to terminals 203-1 and 203-2. Private branch exchange 202 is also capable of handling outgoing calls from terminals 203-1 and 203-2 to the Public Switched Telephone Network via one or more transmission lines.

Private branch exchange 202 is capable of also extending an incoming call (e.g., from terminal 211, etc.) to a telephone number of an "off-premises" terminal in the Public Switched Telephone Network, in addition to switching the same incoming call to an "on-premises terminal" within the enterprise area (e.g., an office building, etc.) that is served by exchange 202. Terminals 203-1 and 203-2 are considered to be on-premises terminals, while terminals 210-1 and 210-2 are considered to be off-premises terminals that are extensions to the enterprise network, with respect to private branch exchange 202. It will be clear to those skilled in the art, after reading this disclosure, how to make and use alternative embodiments of the present invention in which private branch exchange 202 provides telecommunications service to different numbers of terminals 203 and terminals 210 than those depicted.

In addition, private branch exchange 202 is capable of performing the tasks described below and with respect to FIGS. 7 and 8. Although the illustrative embodiment teaches that a private branch exchange performs the described tasks, it will be clear to those skilled in the art, after reading this disclosure, how to make and use the alternative embodiments of the present invention in which, for example, the tasks are performed by a switch or another type of data-processing system within the Public Switched Telephone Network or another type of network. In other words, the present invention is equally well-suited for implementation in public and private telecommunications systems and in wireline and wireless systems as well.

Mobile switching center 208 is capable of switching incoming calls from the Public Switched Telephone Network via one or more transmission lines to wireless terminal 210-2. Mobile switching center 208 is also capable of handling outgoing calls from terminal 210-2 to the Public Switched Telephone Network via one or more transmission lines. Mobile switching center 208 communicates with terminal 210-2 via one or more radio base stations, in well-known fashion. It will be clear to those skilled in the art how to make and use mobile switching center 208.

Telecommunications terminals 210-1 and 210-2 are capable of originating and receiving (i.e., "terminating") telecommunications calls in well-known fashion. The salient components of terminals 210-1 and 210-2 are described below and with respect to FIG. 4. Terminals 210-1 and 210-2 are also capable of performing all of the tasks described below and with respect to FIGS. 9 and 10. It will be clear to those skilled in the art, after reading this disclosure, how to make and use terminals 210-1 and 210-2.

Figure 3:
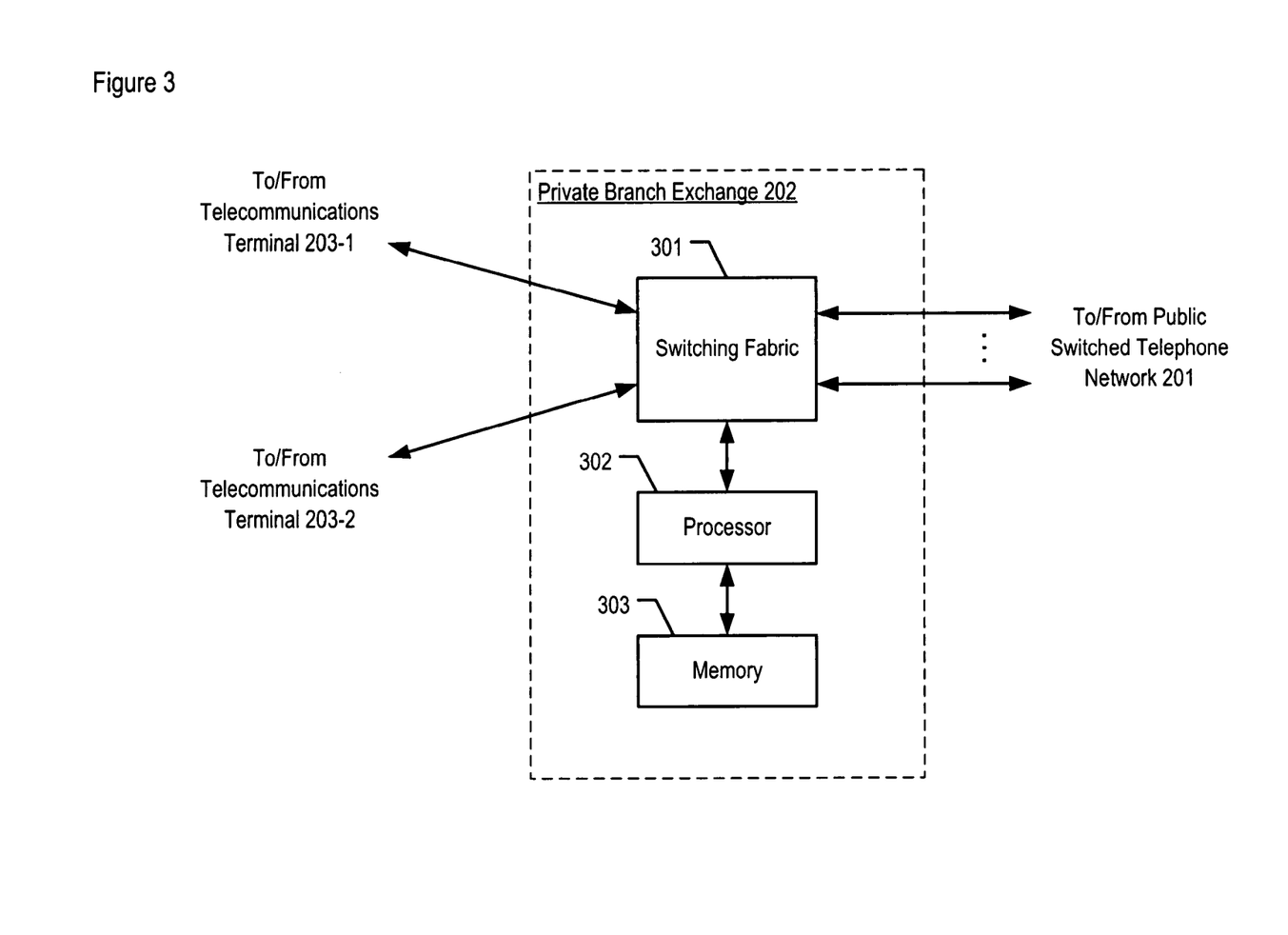
FIG. 3 depicts a block diagram of the salient components of private branch exchange 202 in accordance with the illustrative embodiment of the present invention.

FIG. 3 depicts a block diagram of the salient components of private branch exchange 202 in accordance with the illustrative embodiment of the present invention. Private branch exchange 202 comprises: switching fabric 301, processor 302, and memory 303, interconnected as shown.

Switching fabric 301 is capable of performing all of the tasks described below and with respect to FIGS. 7 and 8 under the direction of processor 302. It will be clear to those skilled in the art, after reading this disclosure, how to make and use switching fabric 301.

Processor 302 is a general-purpose processor that is capable of receiving called-related data from switching fabric 301, of reading data from and writing data to memory 303, and of executing the tasks described below and with respect to FIGS. 7 and 8. In some alternative embodiments of the present invention, processor 302 might be a special-purpose processor. In either case, it will be clear to those skilled in the art, after reading this disclosure, how to make and use processor 302.

Memory 303 is a non-volatile random-access memory that stores the instructions and data used by processor 302. Memory 303 stores the private branch exchange extension and affiliated PSTN telephone number for each PBX user, which are shown in Table 1. It will be clear to those skilled in the art, after reading this disclosure, how to make and use memory 303.

Figure 4:
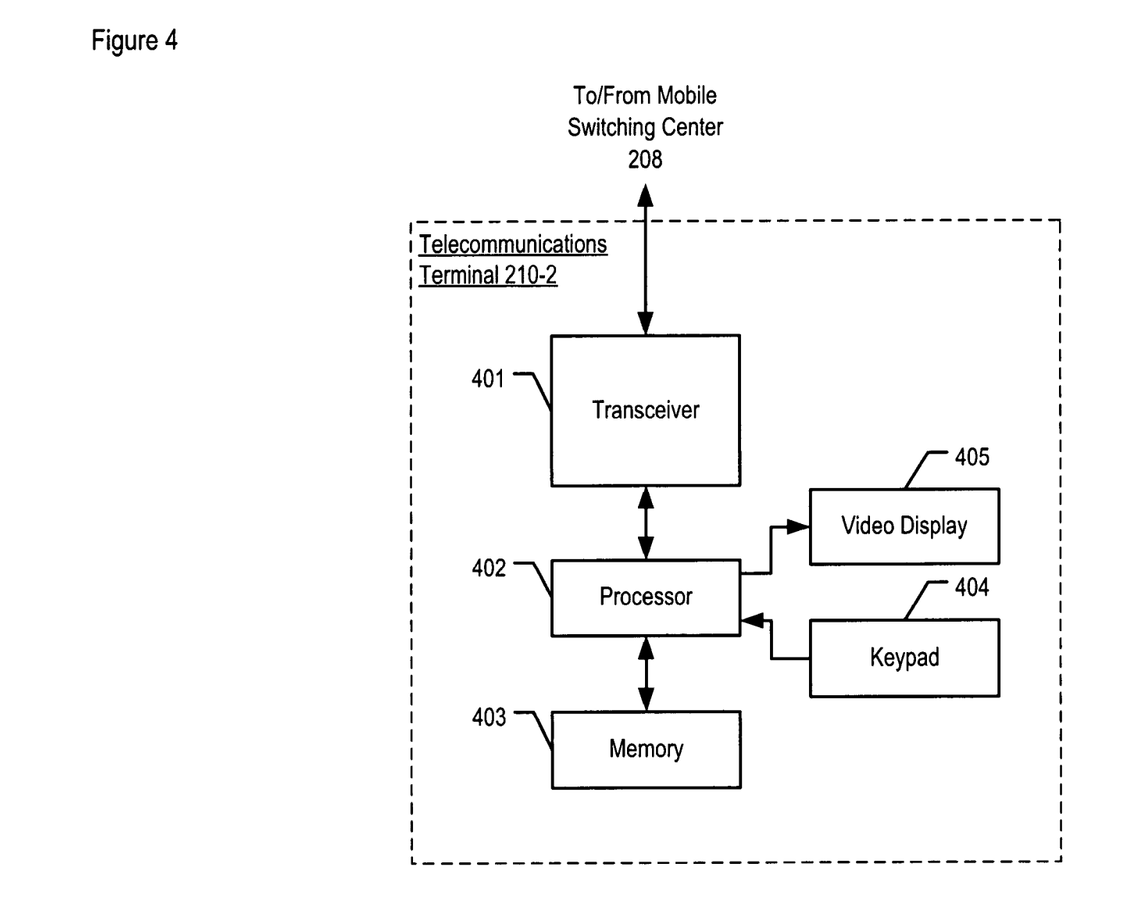
FIG. 4 depicts a block diagram of the salient components of telecommunications terminal 210-2, in accordance with the illustrative embodiment of the present invention.

FIG. 4 depicts a block diagram of the salient components of telecommunications terminal 210-2, in accordance with the illustrative embodiment of the present invention. Although terminal 210-2 is represented in FIG. 4, it will be clear to those skilled in the art, after reading this disclosure, how to make and use other off-premises terminals 210 according to what is described with respect to FIGS. 4, 5, 6, 9, and 10. Telecommunications terminal 210-2 comprises: transceiver 401, processor 402, memory 403, keypad 404, and video display 405, interconnected as shown.

Transceiver 401 comprises a receiving part and a transmitting part. The receiving part receives signals from mobile switching center 208, and forwards the information encoded in the signals to processor 402, in well-known fashion. The transmitting part receives information from processor 402, and outputs signals that encode this information to mobile switching center 208, in well-known fashion. It will be clear to those skilled in the art, after reading this disclosure, how to make and use transceiver 401.

Processor 402 is a general-purpose processor that is capable of: receiving information from transceiver 401 and keypad 404; reading data from and writing data into memory 403; executing the tasks described below and with respect to FIGS. 9 and 10; and transmitting information to transceiver 401 and video display 405. In some alternative embodiments of the present invention, processor 402 might be a special-purpose processor. In either case, it will be clear to those skilled in the art, after reading this disclosure, how to make and use processor 402.

Memory 403 is a non-volatile random-access memory that stores the instructions and data used by processor 402. Memory 403 stores the data that is described below and with respect to FIG. 5. It will be clear to those skilled in the art, after reading this disclosure, how to make and use memory 403.

Keypad 404 is a character and user-selection input device as is well-known in the art that receives input from a user and transmits keypad signals representing that input. Keypad 404 comprises fixed function keys and soft keys, as are known in the art. It will be clear to those skilled in the art how to make and use keypad 404.

Video display 405 is a display output device as is well-known in the art that receives a video signal and creates a visual image of the signal for a user. It will be clear to those skilled in the art how to make and use video display 405.

The illustrative embodiment of the present invention provides for the changing of the user interface at a telecommunications terminal (e.g., terminal 210-2, etc.). The user interface of the terminal is characterized by one or more properties that govern how a user interacts with: (i) the terminal, (ii) a call or calls handled by the terminal, and (ii) one or more data-processing systems accessible by the terminal, such as private branch exchange 202. The user interface properties include, but are not limited to, one or more of the following:

xi. how calls are presented to the user;
    xii. the treatment that a user can apply to calls;
    xiii. the call-dependent features available to the user;
    xiv. the call-independent features available to the user;
    xv. how a user invokes the features;
    xvi. the number of accessible call appearances;
    xvii. the functions that are assigned to the terminal's soft keys;
    xviii. the menus available to the user;
    xix. how the user accesses the menus; and
    xx. the speed dialing list that is in effect.

Telecommunications terminal 210-2 is capable of handling M different user interface properties, wherein M is a positive integer. Terminal 210-2 is also capable of handling N different operating modes, wherein N is a positive integer. The term "operating mode" refers to terminal 210-2 operating as an off-premises terminal to an enterprise network, as its user's personal cell phone, or in yet another operating mode. Although two operating modes are used in the illustrative embodiment, it will be clear to those skilled in the art how to make and use alternative embodiments that support more than two operating modes (e.g., a personal phone, an off-premises terminal to a first enterprise network, an off-premises terminal to a second enterprise network, etc.).

Figure 5:
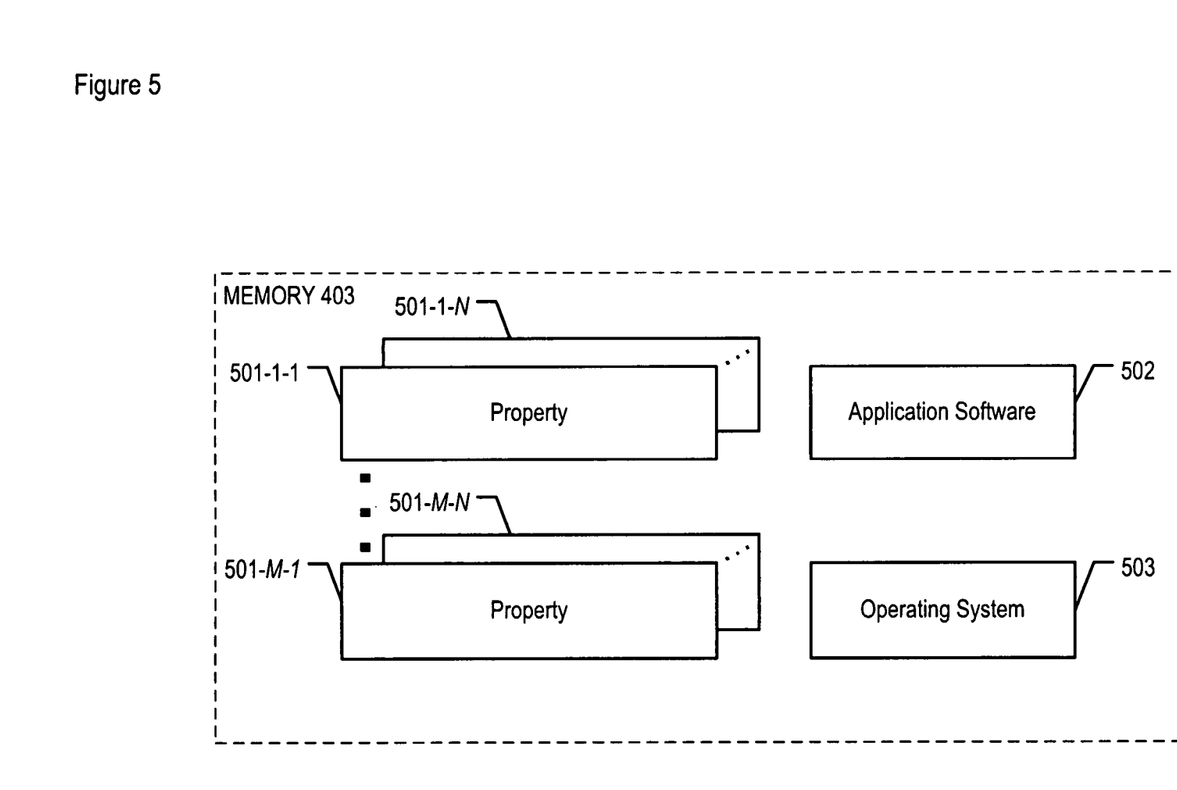
FIG. 5 is a block diagram of how information is stored and organized in memory 403 of terminal 210-2, in accordance with the illustrative embodiment of the present invention.

FIG. 5 is a block diagram of how information is stored and organized in memory 403, in accordance with the illustrative embodiment of the present invention. The information stored in memory 403 comprises: user interface properties 501-$m$-$n$, for m=1 through M and for n=1 through N; application software 502; and operating system 503. As will be appreciated by those skilled in the art, the information that is stored in memory 403 can be organized differently than what is depicted in FIG. 5.

Property 501-$m$-$n$ is a file structure that comprises information (i.e., one or more property values) that describes a particular characteristic of terminal 210-2's user interface for a particular operating mode. For example, property 501-4-2 might comprise information that represents a speed dial list for the "off-premises" operating mode of terminal 210-2, while property 501-4-1 comprises information that represents a speed dial list associated with terminal 210-2's "personal phone" operating mode. In the example, the two sets of information would enable the user to have separate speed dial lists for work-related contacts (e.g., clients, tech support personnel, travel agents, pizza delivery, etc.) and for personal contacts (e.g., friends, family, movie times, pizza delivery, etc.), depending on the terminal's operating mode in effect.

Application software 502 is the software portion of the system described below and with respect to FIGS. 9 and 10. Operating system 503 is an operating system that performs input/output, file and memory management, and all of the other functions normally associated with operating systems, in well-known fashion. It will be clear to those skilled in the art how to make and use operating system 503.

Figure 6A:
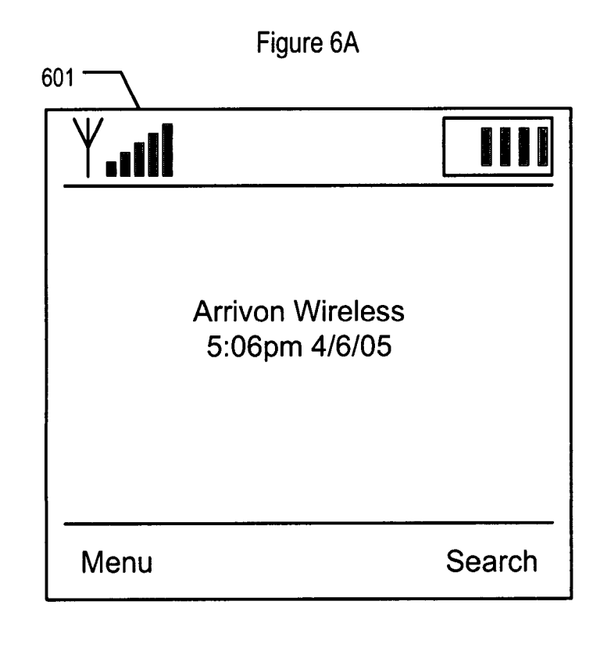
FIGS. 6A and 6B illustrate an example of changing the user interface of terminal 210-2, in accordance with the illustrative embodiment of the present invention.
Figure 6B:
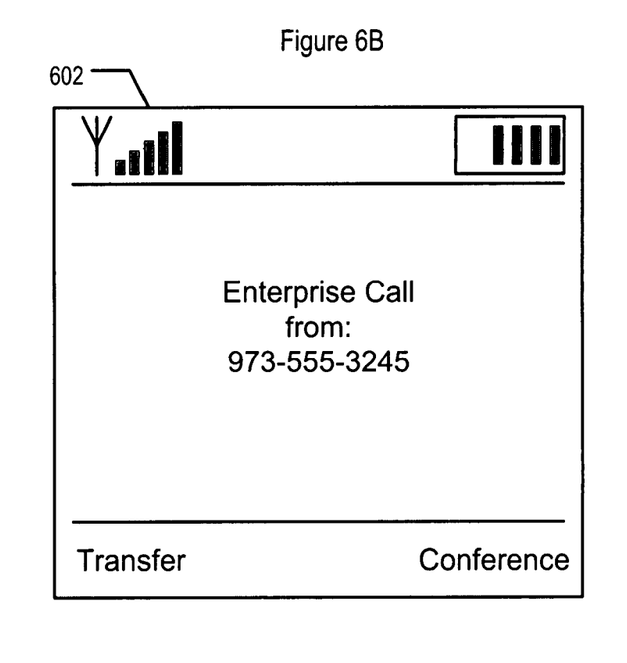

FIGS. 6A and 6B illustrate an example of changing the user interface of terminal 210-2, in accordance with the illustrative embodiment of the present invention. In particular, the example shows: (i) how an incoming enterprise-related call is delivered to the user, with respect to presenting the call-related information, and (ii) how the soft key functions change. As those who are skilled in the art will appreciate, other properties of the user interface might change from one call to the next, depending on the type of call.

FIG. 6A depicts screen shot 601 of video display 405. Screen shot 601 represents what a user might see when terminal 210-2 is operating as the user's personal cell phone and while not handling a call (i.e., while in an idle state). In addition to showing signal strength and battery strength icons that are typically part of a cell phone's display, screen shot 601 shows the cellular carrier's name (i.e., "Arrivon Wireless"), as well as the current time and date. Screen shot 601 also shows the function labels (i.e., "Menu" and "Search") at the bottom of the display that correspond to the soft keys on keypad 404 situated below video display 405.

FIG. 6B depicts screen shot 602 of video display 405. Screen shot 602 represents what a user might see when terminal 210-2, now operating as an off-premises terminal, has received a call from a caller with the telephone number "973-555-3245," wherein the call has been extended from private branch exchange 202. In addition to showing signal strength and battery strength icons, screen shot 602 shows a description of the incoming call that identifies the call as being extended from the terminal's associated enterprise network. Screen shot 602 also shows the labels at the bottom of the display that corresponds to the soft keys on keypad 404. The "Transfer" label identifies the associated soft key that allows the user access to a call transfer feature at private branch exchange 202. The "Conference" label identifies the associated soft key that allows the user access to a call conference feature at private branch exchange 202. Illustrative transfer and conference features are disclosed in U.S. application Ser. No. 11/036,565, which is incorporated by reference herein.

As depicted in FIGS. 6A and 6B, the user interface of terminal 210-2 can be changed on a per-call basis. Some calls are routed to terminal 210-2 via private branch exchange 202 as a first type of call, while other calls are made directly to terminal 210-2 as a second type of call. Changing the user interface based on the type of call, as in accordance with the illustrative embodiment of the present invention, can make the user more effective at handling the call and at interacting with the caller.

Figure 7:
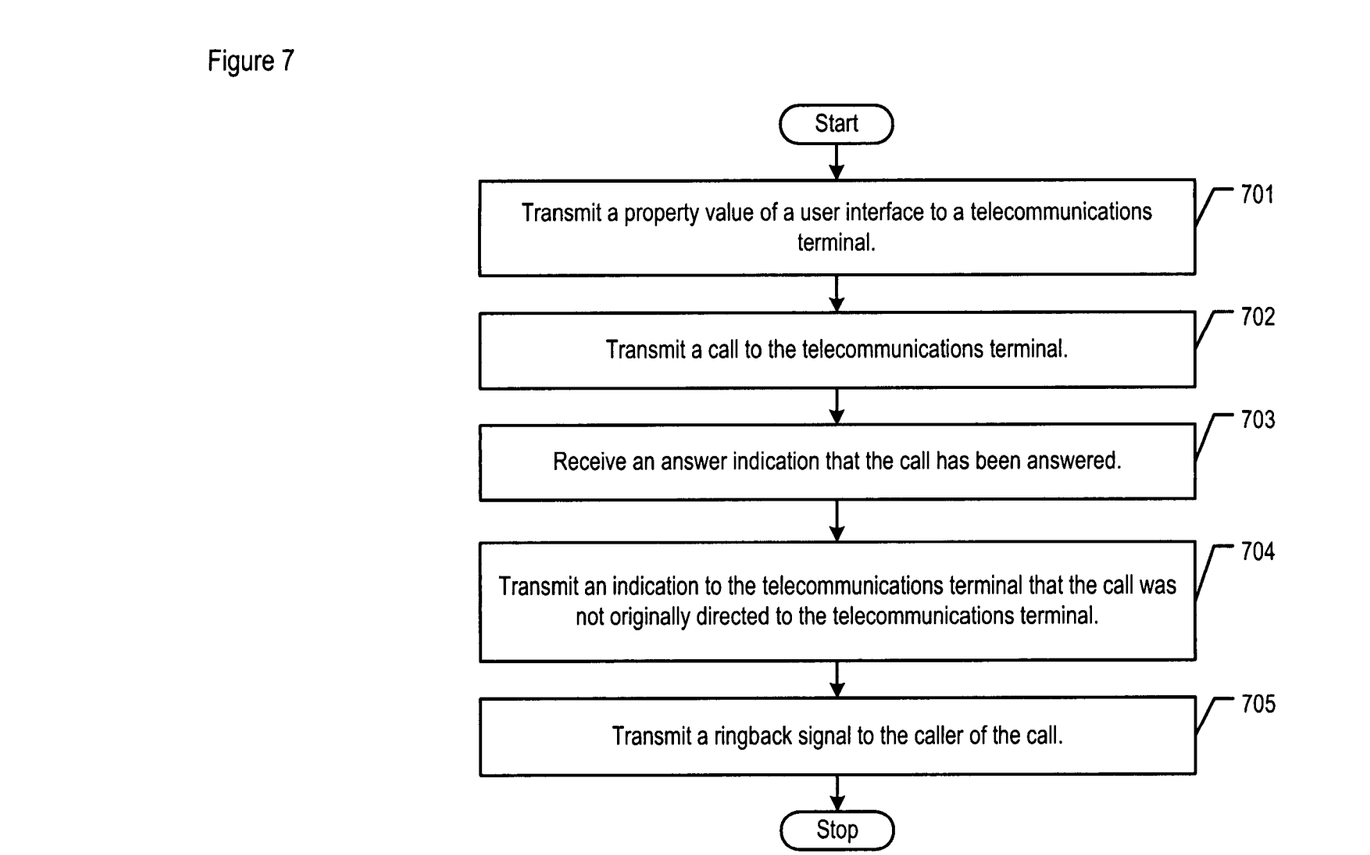
FIG. 7 depicts a first flowchart of the salient tasks associated with private branch exchange 202 transmitting a call to telecommunications terminal 210-2, in accordance with the illustrative embodiment of the present invention.

FIG. 7 depicts a first flowchart of the salient tasks associated with private branch exchange 202 transmitting a call to telecommunications terminal 210-2, in accordance with the illustrative embodiment of the present invention. It will be clear to those skilled in the art which tasks depicted in FIG. 7 can be performed simultaneously or in a different order than that depicted.

At task 701, private branch exchange 202 transmits the values of one or more user interface properties 501 to telecommunications terminal 210-2, in accordance with the illustrative embodiment of the present invention. Private branch exchange 202 transmits the property values as part of an initialization process. For example, the property values can be transmitted when terminal 210-2 is first provisioned to be an off-premises terminal for handling calls from exchange 202. It will be clear to those skilled in the art how to transmit the property values, for example by an over-the-air programming technique, as is known in the art. In some alternative embodiments, terminal 210-2 acquires the property values through another means that does not require private branch exchange 202 to transmit the property values (e.g., direct downloading via a data-link cable, etc.).

At task 702, private branch exchange 202 transmits a call to terminal 210-2 via mobile switching center 208. For example, the transmitting of the call can be in response to exchange 202 (i) having received an incoming call placed to terminal 203-2 and (ii) recognizing that the call is to be extended to terminal 210-2.

At task 703, private branch exchange 202 receives an answer indication from mobile switching center 208 that the call has been answered, in well-known fashion.

At task 704, private branch exchange 202 transmits, to terminal 210-2, an indication (i.e., a call-direction indication) that the call was not originally directed to terminal 210-2. In other words, the caller did not use the telephone number of terminal 210-2 to originate the call. For example, the caller might have wanted to reach a support person at the telephone number of terminal 203-2, but the support person instead answered the call at terminal 210-2.

In accordance with the illustrative embodiment of the present invention, private branch exchange 202 transmits the call-direction indication as a signal on the voice path of the call. The signal is a sequence of in-band tones. In some alternative embodiments, the call-direction indication can be transmitted on a path other than the voice path and can be represented by a different signaling format.

Private branch exchange 202 transmits the call-direction indication in response to having received the answer indication, in accordance with the illustrative embodiment. In some alternative embodiments, exchange 202 transmits the call-direction indication independently of receiving the answer indication. In some other alternative embodiments, exchange 202 might not even receive an answer indication.

At task 705, private branch exchange 202 optionally transmits a ringback signal, as is known in the art, to the caller of the call (e.g., terminal 211, etc.). The transmission of the ringback occurs during at least part of the transmitting of the call-direction indication to terminal 210-2. The transmitted ringback supplements the normal ringback that is transmitted to the called terminal before the called terminal answers the call. The supplemental ringback maintains the caller's attention while terminal 210-2 processes the call-direction indication that it receives, as described below and with respect to FIGS. 9 and 10. Task execution then ends.

Figure 8:
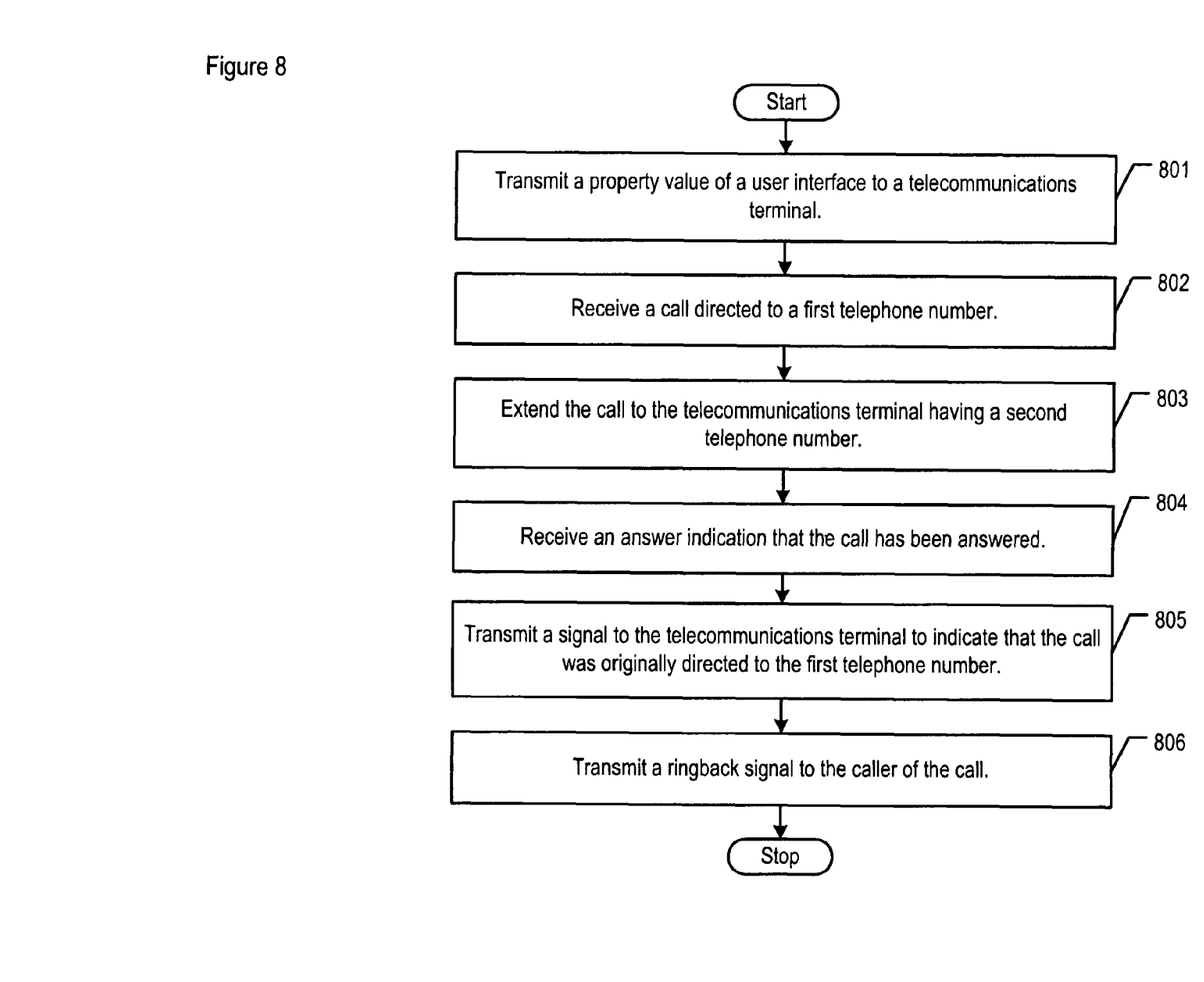
FIG. 8 depicts a second flowchart of the salient tasks associated with private branch exchange 202 transmitting a call to telecommunications terminal 210-2, in accordance with the illustrative embodiment of the present invention.

FIG. 8 depicts a second flowchart of the salient tasks associated with private branch exchange 202 transmitting a call to telecommunications terminal 210-2, in accordance with the illustrative embodiment of the present invention. It will be clear to those skilled in the art which tasks depicted in FIG. 8 can be performed simultaneously or in a different order than that depicted.

At task 801, private branch exchange 202 transmits the values of one or more user interface properties 501 to telecommunications terminal 210-2, in accordance with the illustrative embodiment of the present invention. Task 801 is equivalent to task 701, which was described earlier.

At task 802, private branch exchange 202 receives a call (e.g., from terminal 211, etc.) that is directed to a first telephone number that corresponds to terminal 203-2 served by exchange 202. Exchange 202 determines that there is a second telephone number (i.e., that of terminal 210-2) that is coupled with the first telephone number.

At task 803, private branch exchange 202 extends the call to terminal 210-2 via mobile switching center 208.

At task 804, private branch exchange 202 receives an answer indication from mobile switching center 208 that the call has been answered, in well-known fashion.

At task 805, private branch exchange 202 transmits, to terminal 210-2, an indication (i.e., a call-direction indication) that the call was originally directed to the first telephone number.

In accordance with the illustrative embodiment of the present invention, private branch exchange 202 transmits the call-direction indication as a signal on the voice path of the call. The signal is a sequence of in-band tones. In some alternative embodiments, the call-direction indication can be transmitted on a path other than the voice path and can be represented by a different signaling format.

Private branch exchange 202 transmits the call-direction indication in response to having received the answer indication, in accordance with the illustrative embodiment. In some alternative embodiments, exchange 202 transmits the call-direction indication independently of receiving the answer indication. In some other alternative embodiments, exchange 202 might not even receive an answer indication.

At task 806, private branch exchange 202 optionally transmits a ringback signal, as is known in the art, to the caller of the call (e.g., terminal 211, etc.). Task 806 is equivalent to task 705, which was described earlier. Task execution then ends.

Figure 9:
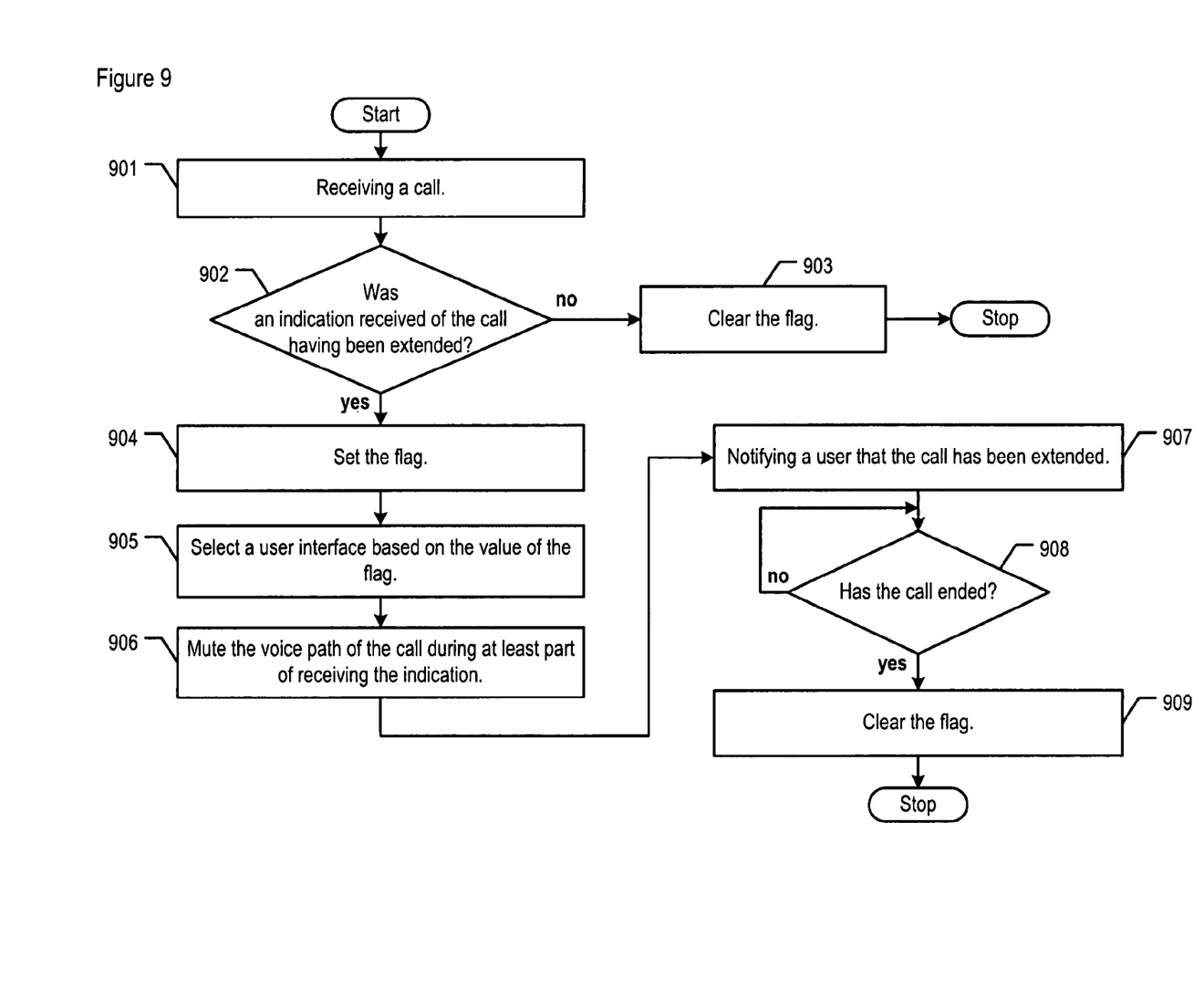
FIG. 9 depicts a first flowchart of the salient tasks associated with telecommunications terminal 210-2 receiving a call from private branch exchange 202, in accordance with the illustrative embodiment of the present invention.

FIG. 9 depicts a first flowchart of the salient tasks associated with telecommunications terminal 210-2 receiving a call from private branch exchange 202, in accordance with the illustrative embodiment of the present invention. It will be clear to those skilled in the art which tasks depicted in FIG. 9 can be performed simultaneously or in a different order than that depicted.

At task 901, telecommunications terminal 210-2 receives a call in well-known fashion.

At task 902, telecommunications terminal 210-2 checks whether or not an indication has been received that indicates that the call has been extended. For example, terminal 210-2 might be receiving the call because a caller (e.g., via terminal 211, etc.) tried calling terminal 203-2, but private branch exchange 202 extended the call to terminal 210-2, in well-known fashion. If the call has been extended, task execution proceeds to task 904. Otherwise, task execution proceeds to task 903.

At task 903, telecommunications terminal 210-2 clears its call-direction flag. Task execution then ends.

At task 904, telecommunications terminal 210-2 sets its call-direction flag. The call-direction flag having been set indicates that the call has been extended (i.e., the call was originally "directed" to another number).

In accordance with the illustrative embodiment of the present invention, telecommunications terminal 210-2 receives the call-direction indication as a signal on the voice path of the call. The signal is a sequence of in-band tones. In some alternative embodiments, the call-direction indication can be received on a path other than the voice path and can be represented by a different signaling format.

At task 905, telecommunications terminal 210-2 selects one or more values of user interface properties 501 to put in effect, based on the value of the call-direction flag.

At task 906, telecommunications terminal 210-2 optionally mutes the voice path of the call during at least part of receiving the call-direction indication. If the call-direction indication is being received on the voice path, terminal 210-2 mutes the voice path because it can be undesirable for the user of terminal 210-2 to hear the indication being received.

At task 907, telecommunications terminal 210-2 notifies its user that the call has been extended. The form of user notification is determined by one or more property values. In accordance with the illustrative embodiment, terminal 210-2 displays the type (i.e., enterprise-related) of the incoming call. In some alternative embodiments, terminal 210-2 notifies its user through another means (e.g., playing a sound, vibrating, flashing a light or display 405, etc.).

At task 908, telecommunications terminal 210-2 monitors the call's progress. If the call has ended, task execution proceeds to task 909. Otherwise, terminal 210-2 continues to monitor the call's progress.

At task 909, telecommunications terminal 210-2 clears the call-direction flag. In some embodiments, terminal 210-2 might perform other functions as a result. For example, terminal 210-2 might revert back to the user interface that corresponds to the terminal's default, factory-programmed operating mode (e.g., that of a personal cell phone, etc.). Task execution then ends.

Figure 10:
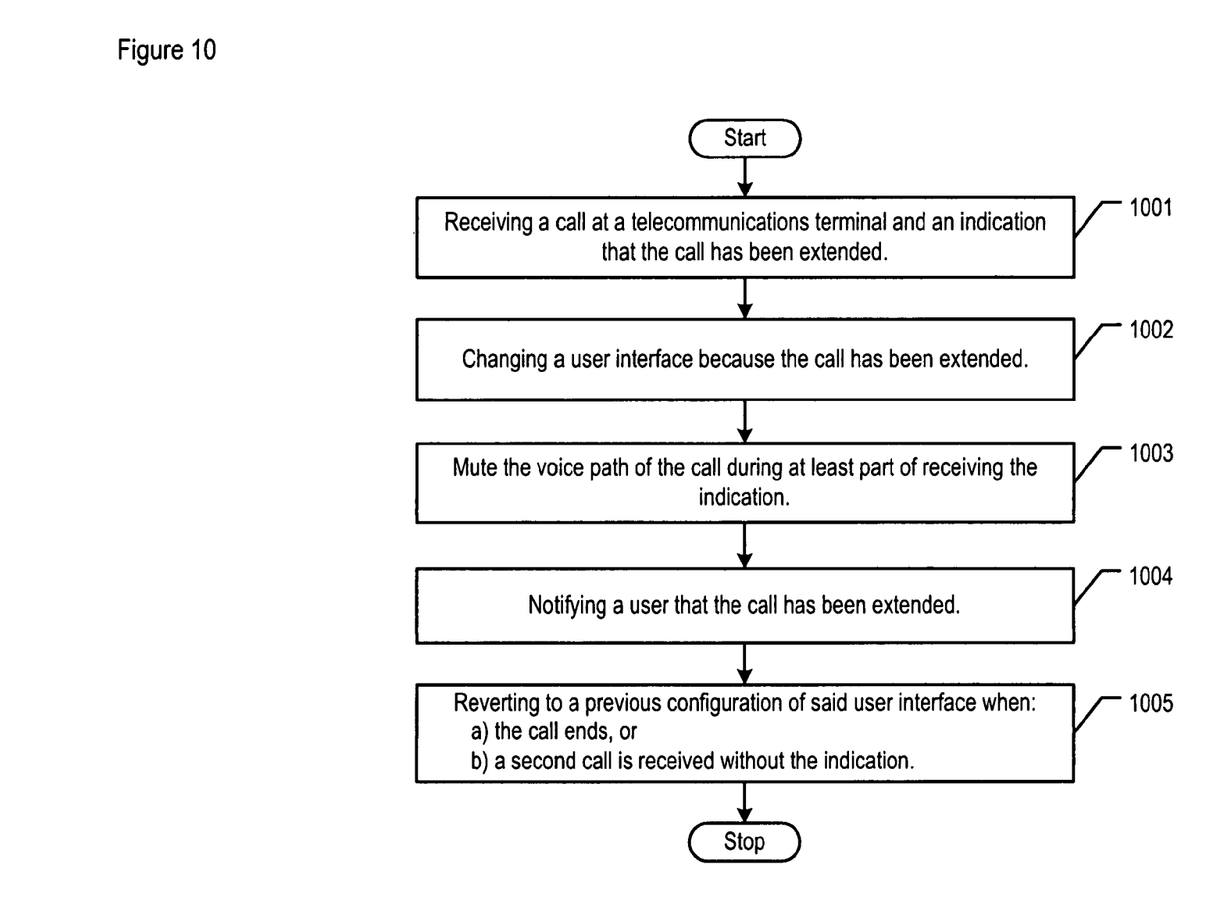
FIG. 10 depicts a second flowchart of the salient tasks associated with telecommunications terminal 210-2 receiving a call from private branch exchange 202, in accordance with the illustrative embodiment of the present invention.

FIG. 10 depicts a second flowchart of the salient tasks associated with telecommunications terminal 210-2 receiving a call from private branch exchange 202, in accordance with the illustrative embodiment of the present invention. It will be clear to those skilled in the art which tasks depicted in FIG. 10 can be performed simultaneously or in a different order than that depicted.

At task 1001, telecommunications terminal 210-2 receives a call in well-known fashion. Terminal 210-2 also receives an indication that the call has been extended. For example, terminal 210-2 might be receiving the call because a caller (e.g., via terminal 211, etc.) originated a call to the telephone number of terminal 203-2, but private branch exchange 202 extended the call to the telephone number of terminal 210-2, in well-known fashion.

In accordance with the illustrative embodiment of the present invention, telecommunications terminal 210-2 receives the indication as a signal on the voice path of the call. The signal is a sequence of in-band tones. In some alternative embodiments, the indication can be received on a path other than the voice path and can be represented by a different signaling format.

At task 1002, telecommunications terminal 210-2 changes a user interface because the call has been extended. For example, terminal 210-2 might have had active a first user interface that corresponds to a first operating mode and, upon receiving the indication, activated a second user interface that corresponds to a second operating mode. In accordance with the illustrative embodiment, terminal 210-2 changes the user interface by applying a different set of values from user interface properties 501. For example, terminal 210-2 might change from one user interface to another by applying properties 501-1-2 through 501-M-2 in place of properties 501-1-1 through 501-M-1.

At task 1003, telecommunications terminal 210-2 optionally mutes the voice path of the call during at least part of receiving the indication. If the indication is being received on the voice path, terminal 210-2 mutes the voice path because it can be undesirable for the user of terminal 210-2 to hear the indication being received.

At task 1004, telecommunications terminal 210-2 notifies its user that the call has been extended. The form of user notification is determined by one or more property values. In accordance with the illustrative embodiment, terminal 210-2 displays the type (i.e., enterprise-related) of the incoming call. In some alternative embodiments, terminal 210-2 notifies its user through another means (e.g., playing a sound, vibrating, flashing a light or display 405, etc.).

At task 1005, telecommunications terminal 210-2 reverts back to a previous configuration of the user interface. For example, terminal 210-2 can revert back to the user interface that corresponds to the terminal's default, factory-programmed operating mode (e.g., that of a personal cell phone, etc.). Terminal 210-2 reverts back when one of multiple events occur. Such events include: (i) the ending of the call, and (ii) a second call being received, wherein the second call is not extended (i.e., the indication is absent from what is received as part of the second call). Task execution then ends.

It is to be understood that the above-described embodiments are merely illustrative of the present invention and that many variations of the above-described embodiments can be devised by those skilled in the art without departing from the scope of the invention. For example, in this Disclosure, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the disclosure to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Disclosure are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   - (a) receiving, at a data-processing system, a call directed to a first telephone number;
   - (b) transmitting said call from said data-processing system to a telecommunications terminal having a second telephone number, wherein said second telephone number is coupled with said first telephone number at said data-processing system;
   - (c) receiving an answer indication that said call has been answered;
   - (d) transmitting, from said data-processing system to said telecommunications terminal, a first indication that said call was not originally directed to said telecommunications terminal; and
   - (e) transmitting a property value of a user interface to said telecommunications terminal, wherein the property value to transmit is selected based upon the first indication, wherein a change in said property value of a user interface changes a speed dialing list that is in effect;

wherein the transmitting of said first indication is based on the receiving of said answer indication.

2. The method of claim 1 wherein said property value determines how said call is presented to the user of said telecommunications terminal.

3. The method of claim 1 wherein the transmitting of said first indication is via the voice path of said call.

4. The method of claim 1 further comprising transmitting a ring back signal to the caller of said call during at least part of the transmitting of said first indication.

5. The method of claim 1 wherein said first telephone number is served by said data-processing system; and wherein said second telephone number is coupled with said first telephone number at said data-processing system.

* * * * *